(12) United States Patent
Uhler

(10) Patent No.: US 7,552,261 B2
(45) Date of Patent: Jun. 23, 2009

(54) CONFIGURABLE PRIORITIZATION OF CORE GENERATED INTERRUPTS

(75) Inventor: G. Michael Uhler, Menlo Park, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 50 days.

(21) Appl. No.: 09/977,089

(22) Filed: Oct. 12, 2001

(65) Prior Publication Data

US 2003/0074508 A1 Apr. 17, 2003

(51) Int. Cl.
*G06F 13/24* (2006.01)
*G06F 13/26* (2006.01)

(52) U.S. Cl. .................. 710/264; 710/260; 710/265
(58) Field of Classification Search .......... 710/260, 710/264–266, 269; 712/244
See application file for complete search history.

(56) References Cited

U.S. PATENT DOCUMENTS

| | | | | |
|---|---|---|---|---|
| 4,056,847 A | * | 11/1977 | Marcantonio | 710/264 |
| 4,110,822 A | * | 8/1978 | Porter et al. | 712/207 |
| 4,217,638 A | | 8/1980 | Namimoto et al. | |
| 4,218,739 A | * | 8/1980 | Negi et al. | 710/262 |
| 4,296,470 A | | 10/1981 | Fairchild et al. | |
| 4,402,042 A | * | 8/1983 | Guttag | 712/207 |
| 4,626,985 A | * | 12/1986 | Briggs | 712/40 |
| 5,025,368 A | * | 6/1991 | Watanabe | 703/27 |
| 5,115,506 A | | 5/1992 | Cohen et al. | |
| 5,148,544 A | * | 9/1992 | Cutler et al. | 710/261 |
| 5,155,853 A | | 10/1992 | Mitsuhira et al. | |
| 5,371,872 A | * | 12/1994 | Larsen et al. | 711/118 |
| 5,386,563 A | | 1/1995 | Thomas | |
| 5,459,682 A | | 10/1995 | Sato | |
| 5,481,719 A | | 1/1996 | Ackerman et al. | |
| 5,481,725 A | * | 1/1996 | Jayakumar et al. | 710/48 |
| 5,594,905 A | * | 1/1997 | Mital | 710/260 |
| 5,603,035 A | | 2/1997 | Erramoun et al. | |

(Continued)

OTHER PUBLICATIONS

"MCF5206 Integrated Microprocessor". Product Brief. Motorola Communication and Advanced Consumer Technologies Group. Freescale Semiconductor, Inc. 1996. MCF5206/D.*

(Continued)

*Primary Examiner*—Thomas J Cleary
(74) *Attorney, Agent, or Firm*—Sterne, Kessler, Goldstein & Fox P.L.L.C.

(57) ABSTRACT

A method and apparatus for generating an interrupt vector associated with either core (internal) generated or off-core (external) generated interrupts is provided. The apparatus includes a number of programmable interrupt priority level fields for storing priority levels for the core generated interrupts, and for the externally generated interrupts, if desired. The apparatus further includes a programmable offset register for storing an offset to be used in calculating the interrupt vector. The apparatus further includes a priority encoder that sorts all of the received interrupts, whether on-core or off-core, according to their priority, utilizing the programmed interrupt priority levels. The priority encoder provides an indication of the received interrupt with the highest priority to a vector generator. The vector generator receives the indication, and calculates an interrupt vector utilizing the programmed offset. Use of the priority encoder and vector generator allows a processing system to programmably specify how core generated interrupts are to be prioritized against external interrupts, thereby allowing interrupt vectors to be directly calculated for core generated interrupts.

34 Claims, 5 Drawing Sheets

U.S. PATENT DOCUMENTS

| | | | |
|---|---|---|---|
| 5,613,151 A | | 3/1997 | Dockser |
| 5,615,348 A | | 3/1997 | Koino et al. |
| 5,664,200 A | * | 9/1997 | Barlow et al. ............... 710/268 |
| 5,682,546 A | | 10/1997 | Garg et al. |
| 5,701,493 A | | 12/1997 | Jagger |
| 5,758,096 A | * | 5/1998 | Barsky et al. .................. 705/3 |
| 5,758,112 A | | 5/1998 | Yeager et al. |
| 5,768,500 A | * | 6/1998 | Agrawal et al. ............... 714/47 |
| 5,797,036 A | | 8/1998 | Kikinis |
| 5,822,595 A | * | 10/1998 | Hu ............................. 710/264 |
| 5,940,587 A | * | 8/1999 | Zimmer ....................... 714/25 |
| 6,081,867 A | | 6/2000 | Cox |
| 6,094,730 A | | 7/2000 | Lopez et al. |
| 6,148,321 A | * | 11/2000 | Hammond .................. 718/100 |
| 6,154,832 A | | 11/2000 | Maupin |
| 6,178,482 B1 | | 1/2001 | Sollars |
| 6,223,279 B1 | | 4/2001 | Nishimura et al. |
| 6,243,804 B1 | | 6/2001 | Cheng |
| 6,332,181 B1 | * | 12/2001 | Bossen et al. ............... 711/155 |
| 6,470,435 B2 | | 10/2002 | Samra et al. |
| 6,477,562 B2 | | 11/2002 | Nemirovsky et al. |
| 6,499,078 B1 | * | 12/2002 | Beckert et al. .............. 710/260 |
| 6,539,448 B1 | | 3/2003 | Deng |
| 6,574,693 B1 | | 6/2003 | Alasti et al. |
| 6,651,126 B1 | | 11/2003 | Cantrell et al. |
| 6,778,506 B1 | * | 8/2004 | McDonnell et al. .......... 370/256 |
| 7,020,879 B1 | * | 3/2006 | Nemirovsky et al. ........ 718/107 |
| 2002/0018486 A1 | * | 2/2002 | Musoll et al. ............... 370/463 |
| 2003/0023799 A1 | * | 1/2003 | Yoo et al. .................. 710/260 |
| 2003/0088723 A1 | * | 5/2003 | Mackey et al. .............. 710/260 |

OTHER PUBLICATIONS

"Addendum to MCF5206 User Manual". Revision 0.1. Motorola Consumer Systems Group. Freescale Semiconductor, Inc. Apr. 13, 1998, MCF5206UMAD/AD.*

Brylow, Dennis et al. "Static Checking of Interrupt-driven Software". 2001. IEEE. pp. 47-56.*

"MIPS32 4K Processor Core Family Software User's Manual". Revision 1.12. Jan. 3, 2001. MIPS Technologies, Inc. Document No. MD00016. Chapter 5. pp. 69-106.*

"MIPS64 5K Processor Core Family Software User's Manual". Revision 02.08. May 28, 2002. MIPS Technologies, Inc. Document No. MD00012. Chapter 5. pp. 103-140.*

Singhal, Ashok et al. "Implementing a Prolog Machine with Multiple Functional Units". 1988 IEEE. pp. 41-49.*

"MCF5206 ColdFire Integrated Microprocessor User's Manual". 1997. Motorola.*

"MIPS32 4K Processor Core Family Software User's Manual". Revision 1.12. Jan. 3, 2001. MIPS Technologies, Inc. Document No. MD00016. pp. i-xii and 1-324.*

"MIPS64 5Kc Processor Core Software User's Manual". Revision 2.2. Aug. 11, 2000. MIPS Technologies, Inc. Document No. MD00055. pp. i-xii and 1-580.*

U.S. Appl. No. 09/312,302, filed May 15, 1999, Nemirovsky et al.

U.S. Appl. No. 09/927,129, filed Aug. 10, 2001, Melvin et al.

Mano, M. Morris. "Computer System Architecture." Prentice Hall. 2ed. pp. 434-443.

* cited by examiner

Flow Chart for Prior Art Interrupt Handling

Configurable Priority Levels

| bit field value | priority level | bit field value | priority level |
|---|---|---|---|
| 0000 | Level 0.5 - Highest | 1000 | Level 4.5 |
| 0001 | Level 1.0 | 1001 | Level 5 |
| 0010 | Level 1.5 | 1010 | Level 5.5 |
| 0011 | Level 2 | 1011 | Level 6 |
| 0100 | Level 2.5 | 1100 | Level 6.5 |
| 0101 | Level 3 | 1101 | Level 7 |
| 0110 | Level 3.5 | 1110 | Level 7.5 |
| 0111 | Level 4 | 1111 | Level 8 |

CONFIGURABLE PRIORITIZATION OF CORE GENERATED INTERRUPTS

CROSS-REFERENCE TO RELATED APPLICATIONS

This application is related to U.S. patent application Ser. No. 09/977,084 entitled "METHOD AND APPARATUS FOR BINDING SHADOW REGISTERS TO VECTORED INTERRUPTS", assigned to MIPS Technologies, Inc.

FIELD OF THE INVENTION

This invention relates in general to the field of computer architecture, and more specifically to a method and apparatus for allowing software configuration of interrupt priorities.

BACKGROUND OF THE INVENTION

Within a computer processing environment, an interrupt, as the name implies, is some event which interrupts normal program execution. That is, programs execute on a microprocessor sequentially, being altered only by those instructions which expressly cause program flow to deviate in some way (e.g., jump instructions, branch instructions, etc.) Interrupts, on the other hand, give system designers a mechanism to "put on hold" normal program flow, for the purpose of executing a special program called an interrupt handler, and then allows the processor to resume normal program flow as if it had never been interrupted. The interrupt handler is only executed when a certain event (interrupt) occurs. The event may be a timer overflowing, or a serial port transmitting a character. By providing the ability to interrupt normal program execution, certain events such as those mentioned above are much easier and more efficient to handle than requiring the microprocessor to periodically execute special programs.

Referring to FIG. 1, a block diagram is provided that will help illustrate how interrupts are handled within a prior art processing environment. The environment 100 includes a microprocessor 102, coupled to an interrupt controller 110 and memory 120. The microprocessor contains a core 104 for executing instructions retrieved from the memory 120. In addition, the core 104 produces a number of interrupts 106, including both software interrupts and hardware interrupts (e.g., timer overflow) that must be "handled" by the microprocessor 102, as will be further described below with reference to FIG. 2. The microprocessor 102 further includes a cause register 108 for indicating to the microprocessor 102 the cause or source of an interrupt.

The interrupt controller 110 is coupled to a number of external devices 118 via interrupt lines 116, and to other system interrupts 114. The interrupt controller 110, orders the interrupts 110 to provide them to the microprocessor 102 via interrupt lines 112. One skilled in the art will appreciate that early microprocessors 102 were provided with a preset number of interrupt lines 112 for use by system level designers. However, as the need for interrupts increased, rather than adding additional pins on the microprocessor, interrupt controllers 110 were provided to interface between the increased number of interrupts 114, 116, and the existing interrupt lines 112 on the microprocessor 102.

The microprocessor 102 is connected to the memory 120, to retrieve instructions for execution, as mentioned above, and to retrieve information relating to interrupts, such as an interrupt vector table 122, and to retrieve the programs which handle the interrupts 124.

Referring now to FIG. 2, a flow chart 200 is shown that illustrates prior art program flow when an interrupt occurs within the microprocessor 102. Operation of the program flow for handling interrupts will now be described with reference to both FIGS. 1 and 2.

Program execution begins at block 202 and proceeds to block 204.

At block 204, instructions are executed by the microprocessor 102 that are retrieved from memory 120. Flow then proceeds to decision block 206.

At decision block 206, a determination is made by the microprocessor 102 as to whether an interrupt has occurred, either by the core 104, or by the interrupt lines 112. Although not shown, the microprocessor 102 includes logic that detects and latches an interrupt when it occurs, thereby alerting the microprocessor 102 of the interrupt. The state of the latches is typically checked by the microprocessor 102 between every instruction execution. If no interrupt has occurred, flow proceeds back to block 204 where the microprocessor 102 continues to execute instructions. However, if an interrupt occurs, flow proceeds to block 208.

At block 208, the microprocessor 102 ceases execution of the current program instructions, and jumps to a special program called an interrupt handler (or exception handler), such as interrupt handler #1 124. Flow then proceeds to block 210.

At block 210, the interrupt handler reads the cause register 108 to determine what kind of interrupt occurred. Flow then proceeds to block 212.

At block 212, the interrupt vector table 122 is read to determine which interrupt handler 124 should be used for the type of interrupt indicated in the cause register 108. When determined, the microprocessor 102 jumps to a particular interrupt handler routine 124 specific to the type of interrupt indicated in the cause register 108. One skilled in the art will recognize that methods other than an interrupt vector table may be used to determine which interrupt handler should be used. Flow then proceeds to block 214.

At block 214, the interrupt is handled by the particular interrupt handler routine 124 that was jumped to. Flow then proceeds to block 216.

At block 216, the interrupt handler 124 returns program flow back to block 204 to continue execution of the program that was executing when the interrupt occurred.

One skilled in the art will appreciate that the above description of the microprocessor system 100, and the interrupt handling flow chart 200 is very general. That is, the description has ignored more complex aspects of interrupt handling, such as what occurs when multiple interrupts occur at the same time, or when an interrupt occurs during handling of another interrupt, or how multiple interrupts are prioritized, etc. However, the above is sufficient to illustrate that: 1) interrupts can occur from sources that are both internal and external to the microprocessor 102, that the microprocessor 102 must have some mechanism for prioritizing interrupts when multiple interrupts occur at approximately the same time, and that one method that has been utilized in the prior art requires an interrupt handler to query a cause register 108 within the microprocessor 102 to determine the type of interrupt that has occurred, before it can decide which interrupt handler routine is appropriate to handle the interrupt.

For interrupts that do not require immediate processing, the time required to jump to a general exception handler, such as that described above with reference to block 208, to determine the cause of the interrupt, and the memory vector for the specific interrupt routine that is required, is not critical. Thus, if it takes 20-50 clock cycles, for example, to determine that the cause of the interrupt is a floppy disk controller indicating that it is ready to write data, the delay relating to determining the type of interrupt is inconsequential.

However, in many instances the delay associated with determining the type of interrupt (as illustrated in FIG. 2) is unacceptable. In such instances, it is common to provide interrupt vectors to a subset of all interrupts, via hardware. That is, interrupts that require immediate processing are attached to one of the first two interrupt lines 112, for example. When an interrupt occurs on one of these lines, the interrupt vector for that line is provided immediately to the microprocessor 102 (via hardware within the microprocessor), causing the microprocessor to jump immediately to the proper interrupt routine (at block 212), rather than the general routine (at block 208).

Direct mapping of high priority interrupts to particular interrupt vectors has allowed certain interrupts to be handled quickly, while allowing programmers to specify how other lower priority interrupts are handled via the general interrupt handler. However, such direct mapping is typically static, for a given processor architecture. That is, such mapping does not allow a system designer to define high/low priorities for particular implementations, nor does it allow the system designer to establish their own vectors for particular processor generated interrupts. In addition, the previous solutions have not allowed a designer to establish selective priorities for core generated interrupts that merge with off processor interrupts.

Therefore, what is needed is a mechanism that allows a system designer to establish interrupt priorities for both core generated, and off-core generated interrupts.

Moreover, what is needed is a mechanism for programmably prioritizing core generated interrupts within a system level interrupt architecture.

SUMMARY

The present invention provides a method and apparatus for allowing a system designer to programmably define priority levels for on-core interrupts, and vector offsets, such that on-core and off-core interrupts are considered together in terms of priority level, and direct interrupt vectors are provided for either type of interrupt.

In one aspect, the present invention provides a processing system that includes a plurality of first interrupts, a plurality of second interrupts, and a priority encoder. The plurality of first interrupts are generated by a core and have priority levels that are programmable. The plurality of second interrupts are generated external to the core, typically coming from an interrupt controller. The priority encoder is coupled to both the first interrupts and to the second interrupts, and prioritizes the interrupts utilizing the priority levels programmed for the first interrupts.

In another aspect, the present invention provides a microprocessor for handling interrupts, the microprocessor receiving first interrupts from an interrupt controller. The microprocessor includes a core, priority storage means, and a priority encoder. The core executes instructions and generates second interrupts. The priority storage means store programmable priorities for the second interrupts. The priority encoder receives the first and the second interrupts, prioritizes the first and the second interrupts utilizing the programmable priorities stored in the priority storage means.

In yet another aspect, the present invention provides a method for prioritizing on-core and off-core interrupts within a processing system. The method includes: receiving the off-core interrupts; receiving the on-core interrupts, the on-core interrupts having programmable priority levels; sorting the received off-core and on-core interrupts according to their priority levels; and producing an indication of which of the received off-core and on-core interrupts has the highest priority.

A further aspect of the present invention provides a computer program product for use with a computing device, the computer program product having a computer usable medium, having computer readable program code embodied in the medium, for causing a microprocessor to be described. The computer readable program code includes: first program code for providing an interrupt priority encoder for prioritizing between core generated interrupts and non-core generated interrupts; and second program code for providing an interrupt vector generator, for receiving an indication from the priority encoder of a highest priority interrupt, and for generated an interrupt vector for the highest priority interrupt.

In another aspect, the present invention provides a computer data signal embodied in a transmission medium that includes computer-readable program code for providing a microprocessor for handling both internally generated and externally generated interrupts. The program code includes: first program code for providing a programmable offset storage register for storing a programmable offset; second program code for providing a plurality of interrupt priority level fields that store programmed priority levels for the internally generated interrupts; third program code for providing a priority encoder, the encoder prioritizing between the internally generated and externally generated interrupts utilizing the programmed priority levels to select an interrupt with the highest priority, the encoder providing an indication of the interrupt with the highest priority; and fourth program code for providing a vector generator for generating an interrupt vector for the interrupt with the highest priority, the vector generator utilizing the programmable offset to calculate the interrupt vector.

Other features and advantages of the present invention will become apparent upon study of the remaining portions of the specification and drawings.

DETAILED DESCRIPTION

The issue of selectively prioritizing processor interrupts, and incorporating those within the interrupt strategy of off-chip, or on-chip but off core interrupts, is ubiquitous throughout microprocessor architectures. However, to allow the reader to better appreciate the novel solution to this problem, the solution will be described with particular reference to MIPS® processors, developed by MIPS Technologies, Inc. of Mountain View Calif. (see www.mips.com).

Figure 1:
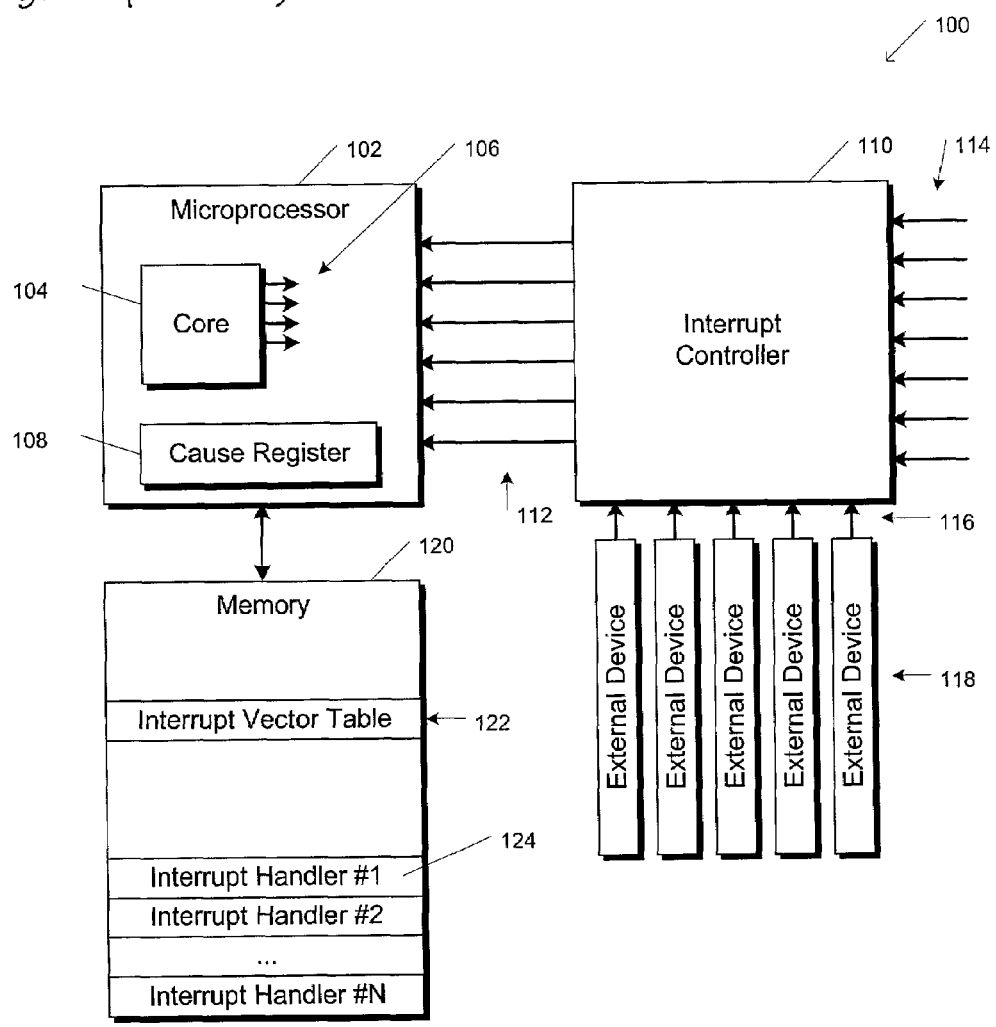
FIG. 1 is block diagram of a prior art microprocessor environment.
Figure 2:
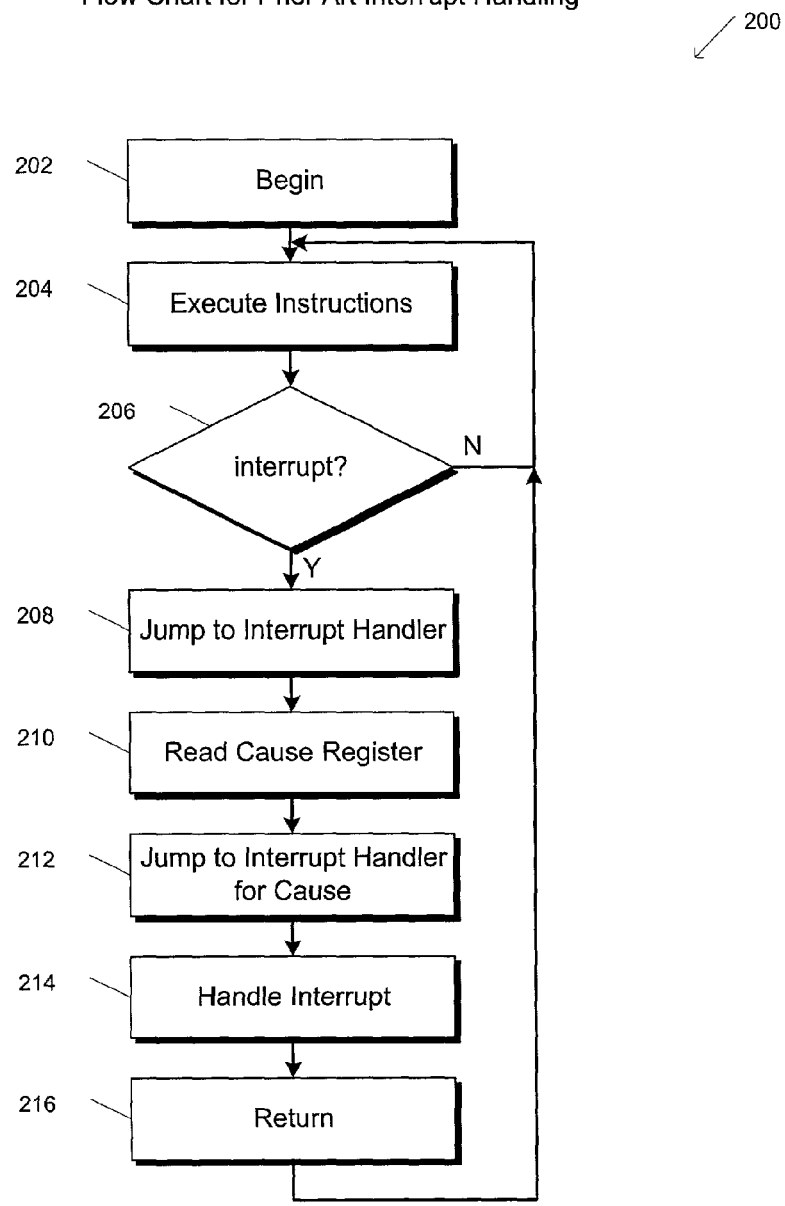
FIG. 2 is a flow chart of a prior art method of handling interrupts.
Figures 3, 5:
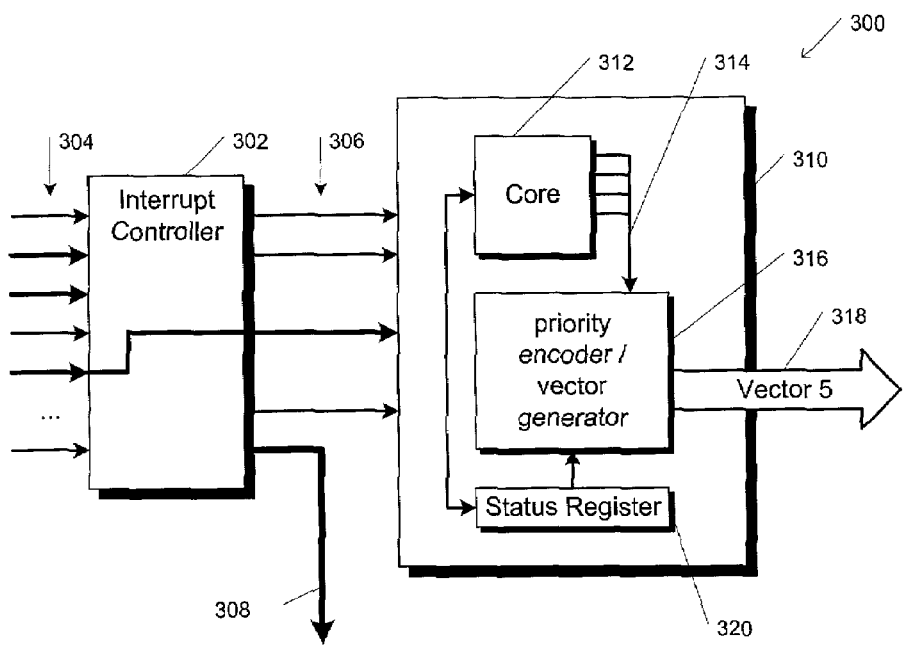
FIG. 3 is a block diagram of a microprocessor according to the present invention.
FIG. 5 is a table illustrating available interrupt priority levels according to the present invention.

Referring now to FIG. 3, a block diagram is shown of a microprocessor based system 300 according to the present invention. The system 300 includes a microprocessor 310 coupled to an interrupt controller 302. One skilled in the art will appreciate that the microprocessor 310 and the interrupt controller 302 could physically reside on separate chips, or alternatively, could reside on the same piece of silicon in a system on a chip (SOC). The interrupt controller 302 is attached to a number of system interrupt lines 304. In one embodiment, there are sixteen interrupt lines 304 provided in the system 300, although additional interrupt lines can easily be accommodated by cascading multiple interrupt controller's 302. The interrupt controller 302 prioritizes all of its interrupts 304, and passes its interrupt requests to the processor 302 on the processor's 302 interrupt lines 306. In one embodiment, the processor 310 provides for eight interrupt lines 306. In addition, the interrupt controller passes the interrupt requests 304 to other processor cores (not shown) on interrupt bus 308.

Within the microprocessor 310 are a core 312, a priority encoder and vector generator (PEVG) 316, and a status register 320. The core 312 is responsible for executing instructions provided to the microprocessor 310 by a memory (not shown). In addition, the core 312 generates a number of core specific interrupts 314 (or internally generated interrupts), as will be further described below, to the PEVG 316. The PEVG 316 also receives the interrupts 306 provided by the interrupt controller 302 (e.g., externally generated interrupts). The PEVG merges the prioritized interrupts 306 with the interrupts 314 generated by the core 312, and generates an interrupt vector 318 corresponding to the highest priority interrupt, as determined by the PEVG 316. In one embodiment, information related to the interrupts 306, 314 is found in the status register 320, as will be further described below.

Figure 4:
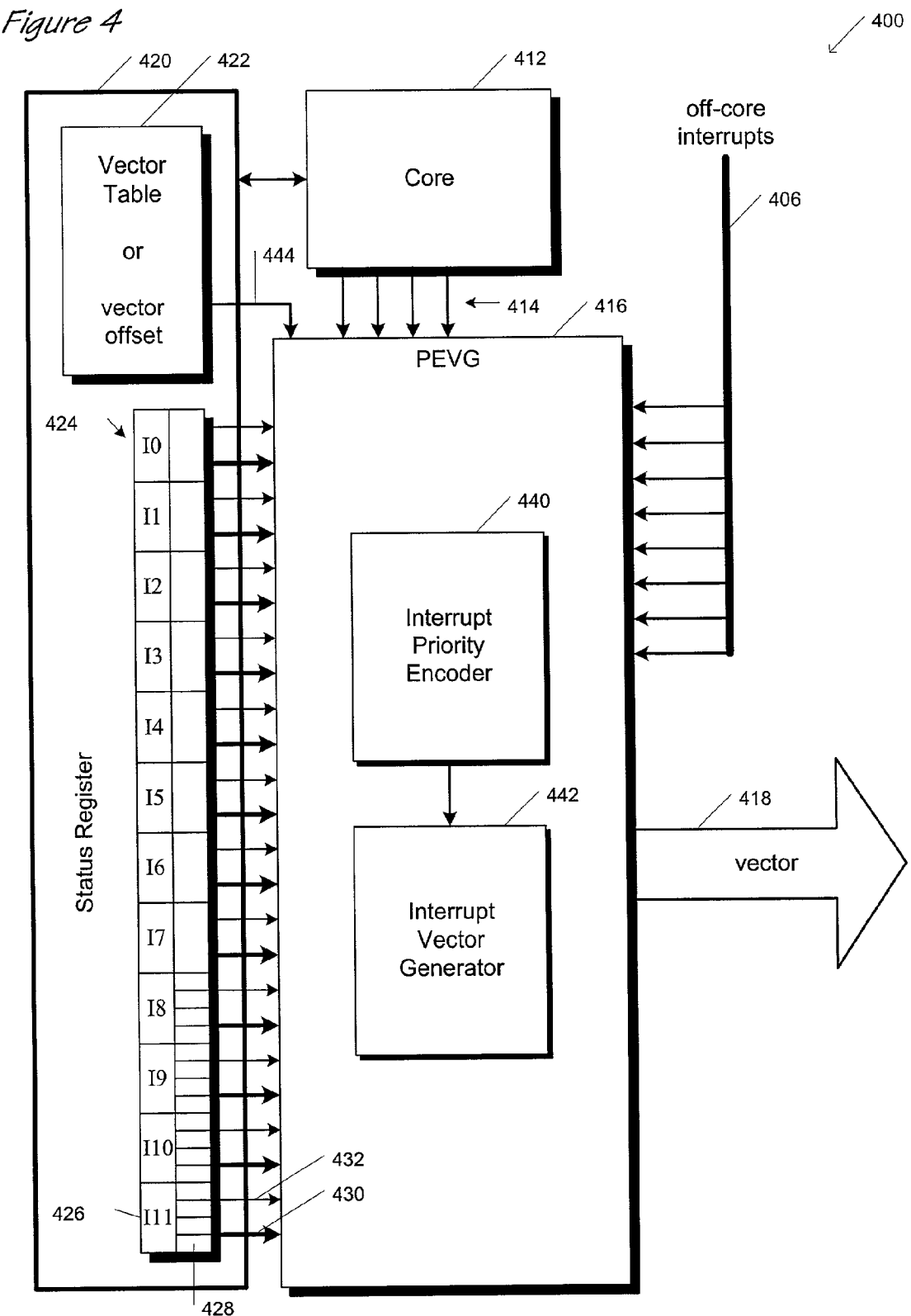
FIG. 4 is a block diagram of a microprocessor according to the present invention, particularly detailed and encoder and vector generator according to the present invention.

Referring now to FIG. 4, a block diagram is provided of a microprocessor 400 that more specifically illustrates details of an embodiment of the present invention. Like elements have like numerals with the hundreds digit being replaced by a "4".

A core 412 is shown coupled to a status register 420, and a PEVG 416, as in FIG. 4. The core 412 executes instructions retrieved from a memory (not shown) including interrupt handler routines referenced by a memory vector 418 provided by the PEVG 416. In addition, as will be further described below, the core 412 reads and writes values from/to particular registers within the status register 420, including a vector table 422, an interrupt register 424 (having a number of interrupt specific registers 426), and interrupt priority registers 428. In one embodiment, the core 412 only writes to these registers when executing operating system or kernel mode instructions. Although not specifically labeled, in one embodiment the status register 420 contains an interrupt register 424 that has a 12-bit field, where each bit field 426 corresponds to one of twelve possible interrupts that may be handled by the processor 400. The bit fields 426 may be used as an interrupt mask for each of the interrupts 0-11 (e.g., a value of "1" in a bit field would indicate that the interrupt is enabled, a value of "0" would indicate that the interrupt is not enabled). One skilled in the art will appreciate that if more interrupts are desired to be handled by the processor 400, additional bit fields 426 may be added to the register 424.

Associated with one or more of the bit fields 426 are four bit priority registers 428 for storing the desired interrupt priority level for each of the interrupts handled by the processor 400. In one embodiment, the priority registers 428 are only provided for interrupts I8 through I11 corresponding to Core 412 generated interrupts 414. In an alternative embodiment, the priority registers 428 are provided for all interrupts within the register 424. That is, the inventor envisions that in one embodiment, the interrupts I0 through I7 should have their interrupt priority already defined (architecturally), while allowing the core interrupts to be configured as will be described further below with reference to FIG. 5. Alternatively, the inventor envisions providing registers 428 for each of the interrupt fields 426, to allow a system designer to create an interrupt priority scheme that is exactly what they desire. In a further embodiment, the inventor envisions a crossbar control that sets up the interconnection network of the inputs and outputs of the crossbar. This is done with a bit mask, rather than 4-bit fields.

Although not shown, additional registers are contained within the coprocessor 0 interface of the MIPS processors. Information regarding the other fields may be found in the Software User's Manual for the MIPS32 or MIPS64 Processor Core Family, Section 5 'CP0 Registers", pages 70-106, which is incorporated herein by reference for all purposes.

Referring briefly to FIG. 5, a table 500 is provided illustrating the 16 possible interrupt levels that can be defined by the priority registers 428. That is, for each of the bit fields 426, corresponding to each of the interrupts for the processor 400, a priority level can be assigned by placing one of the sixteen values of table 500 into the corresponding register 428. In one embodiment, the interrupt levels have been designed to allow any of the core interrupts I8-I11 to be prioritized to have either: the same priority levels available to interrupts I0-I7; or priorities in between any of the eight processor interrupt levels. For example, if a system designer wished to have all of the core interrupts 414 to have a higher interrupt priority level than system interrupt I2, but not as high as I1, then a value of "0010" (corresponding to priority level 1.5) would be placed in the registers 428 corresponding to interrupts I8-I11. Alternatively, interrupts I8-I10 could be assigned to have a low interrupt priority, equivalent to level 8 "1111", for example, while core interrupt I11 could be assigned to have a higher interrupt priority, (e.g. 0.5 -"0000"), than even system interrupt I0.

With the above described table 500 in mind, the reader is referred back to FIG. 4. In one embodiment, the core interrupts 414 include: two hardware interrupts (I8 and I9) and two software interrupts (I10-I11). The two hardware interrupts include a timer interrupt I8, and a performance counter interrupt I9. One benefit that is effected by providing the registers 428 is that the core generated interrupts 414, including the timer interrupt I8 and the performance counter interrupt I9, can be programmed to have interrupt priorities equal to, or in between, any of the off-core interrupts 406 that have already been prioritized by the off-core interrupt controller 402. That is, the present invention has allowed the on-core interrupts 414 to be configurably injected into the priority scheme already existing for the off-core interrupts 406.

More specifically, eight off core interrupts 406 are presented to the PEVG 416. In addition, four on-core interrupts 414 are presented to the PEVG 416. When an interrupt occurs to the processor 400, the processor 400 reads the registers 426 via register lines 432 to determine whether the received interrupt(s) is/are enabled. In addition, the PEVG 416 reads the contents of the registers 428 via bus lines 430 to determine the priority setting for the received interrupt(s). An interrupt priority encoder 440, having received the interrupt(s), performs a top to bottom search, according to priority levels retrieved from the registers 428, to determine which of the interrupt(s) has the highest priority. Thus, the priority encoder 440 has taken into consideration the off-core interrupt levels, as set by the interrupt controller 302, and the on-core interrupt levels, as programmed in the registers 428, to determine which of the received interrupts has the highest priority.

When the priority encoder 440 has determined which of the received interrupts has the highest priority, it provides an indication of the highest priority interrupt to an interrupt vector generator 442. The interrupt vector generator 442 retrieves the appropriate interrupt vector from the vector table 422 within the status register 420, and produces the vector 418 for the received interrupt having the highest priority. In an alternative embodiment, rather than using the vector table 422 to store the interrupt vectors, the vector location for interrupt I0 is predefined. Then, a programmable offset is stored in the vector offset 422. When the encoder 440 determines which of the received interrupts has the highest priority, it provides the interrupt number to the vector generator 442. The vector generator reads the offset from the vector offset 422, via bus 444, and performs the calculation:

Vector=base+offset*spacing (the interrupt number)

The vector generator then provides the calculated vector for the received interrupt on line 418.

Figure 6:
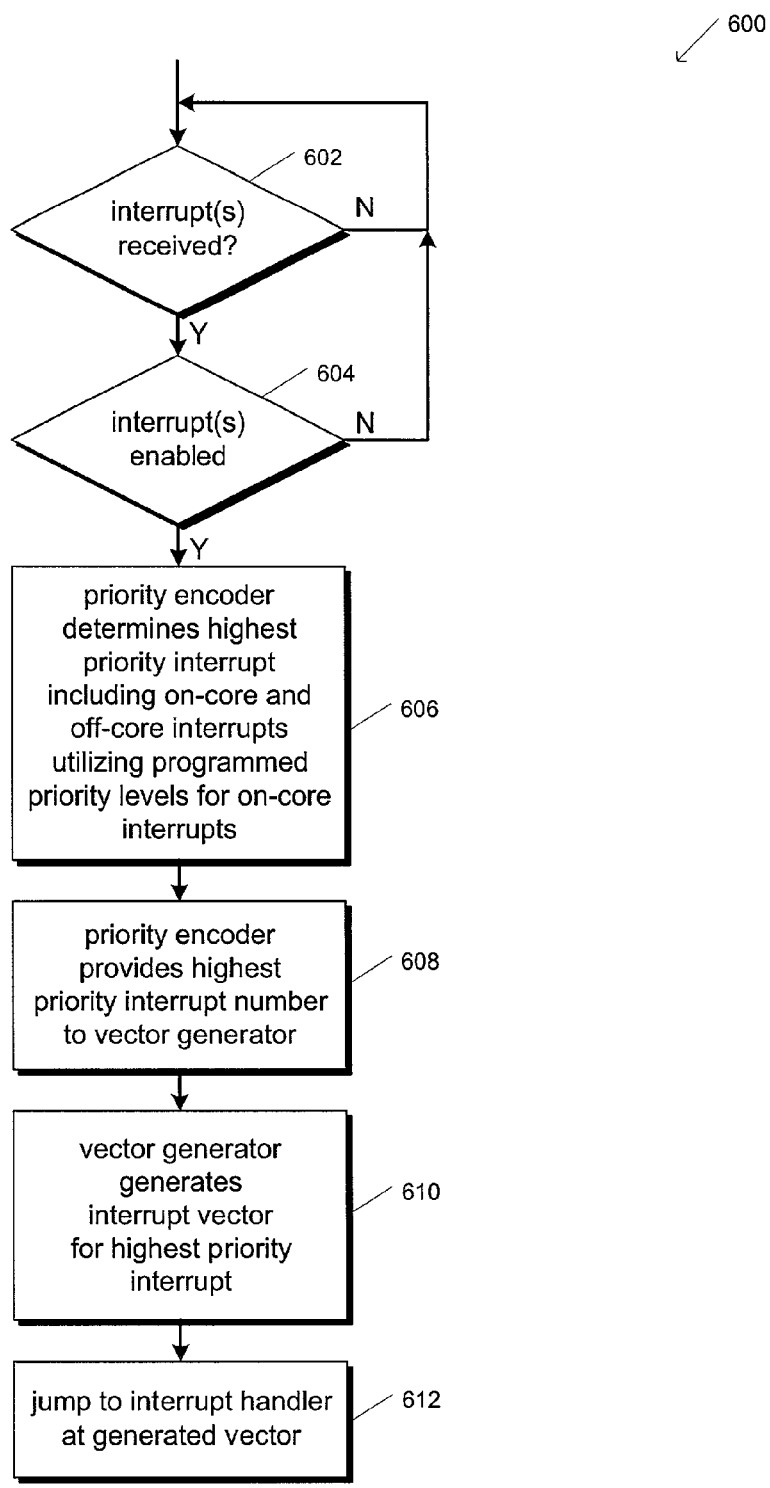
FIG. 6 is a flow chart illustrating the method according to the present invention.

Referring now to FIG. 6, a flow chart 600 is provided that illustrates the method according to the present invention. Flow begins at decision block 602 where a determination is made as to whether one or more interrupts have been received by the processor 400. If not, flow remains at decision block 602. When one or more interrupts is received, flow proceeds to decision block 604.

At decision block 604, a determination is made by the processor as to whether the received interrupt(s) have been enabled. In one embodiment, this determination is made utilizing the interrupt mask bits I0-I11 in registers 426. If the received interrupt(s) have not been enabled, flow proceeds back to decision block 602 to await another interrupt. If the received interrupt(s) have been enabled, flow proceeds to block 606.

At block 606, the priority encoder determines the highest priority interrupt for the received and enabled interrupts, including both on-core and off-core interrupts. For example, presume that interrupts I0-I7 have architected priorities of levels 1, 2, 3, 4, 5, 6, 7, and 8, respectively. Presume further that interrupts I8 and I9 have been programmed to have a priority level of 4.5, that interrupt I10 has a programmed priority level of 1.5, and that interrupt I11 has a programmed priority level of 0.5. Then, the encoder 440 would prioritize the received interrupts in the following order:

| Interrupt | Priority Level |
|---|---|
| I11 | 0.5 |
| I0 | 1.0 |
| I10 | 1.5 |
| I1 | 2.0 |
| I2 | 3.0 |
| I3 | 4.0 |
| I8, I9 | 4.5 |
| I4 | 5.0 |
| I5 | 6.0 |
| I6 | 7.0 |
| I7 | 8.0 |

At block 608, from the received enabled interrupts, the encoder selects the highest priority interrupt, as illustrated in the above table. An indication as to which interrupt has the highest priority is provided to the vector generator 442. Flow then proceeds to block 610.

At block 610, the vector generator 442 generates an interrupt vector for the highest priority interrupt. As explained above, the interrupt vector can be provided either from a vector table, or alternatively, by calculating the vector by adding the base plus the offset times the spacing for the particular interrupt. Once the vector is provided, flow proceeds to block 612.

At block 612, the processor 400 jumps to the interrupt handler at the vector generated in block 610. In some instances, the interrupt vector may simply be the general exception handler. In other cases however, especially for high priority interrupts including on-core interrupts, the interrupt vector will direct the processor 400 to an interrupt handler that is specific to the received interrupt. In this instance, even core produced interrupts, if programmed to have a priority level that is higher than another received interrupt (including off-core interrupts), cause the processor to jump directly to an interrupt handler that is specific to the interrupt, without first requiring that a general exception handler determine the interrupt cause.

What has been described above is a method and apparatus for allowing on-core interrupts to be merged with off-core interrupts, with respect to determining interrupt priority level, and for directly providing interrupt vectors for on-core interrupts. The present invention has thus allowed a system designer to configure an interrupt strategy for core produced interrupts without altering the interrupt priority architecture defined within an existing interrupt controller. The embodiment described above has allowed up to sixteen priority levels for twelve (or more) interrupts, provided from either on-core or off-core sources. The embodiment has further allowed the priority levels of the on-core and off-core interrupts, as well as the vector offset, to be programmable.

One skilled in the art will appreciate that the mechanism for programming the priority levels for the interrupts, and the vector offset (or vector table), will be specific to the particular processor architecture into which the present invention is placed. However, within the MIPS Architecture, two instructions (MFC0 and MTFC0) are provided to move data to and from Coprocessor 0, which is the architected interface to the Status Register containing the registers associated with the on-core interrupts. Of course, other methods are within the mind of the inventor.

For example, if a particular implementation is of sufficient volume, the priorities for the on-core interrupts may be programmed via hardware (such as a fuse array). In addition, although the embodiment described provides a four bit field for each on-core interrupt, the priority levels of all interrupts, or at least of all on-core interrupts, may be stored together in a register such that the priority level of a subset of the on-core interrupts may be deduced therefrom.

Although the present invention and its objects, features, and advantages have been described in detail, other embodiments are encompassed by the invention. In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core that is embodied in program code and may be transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A processing system comprising:
   a plurality of first interrupts generated by a core, said plurality of first interrupts having programmable priorities;
   a plurality of second interrupts that are generated external to said core, said second interrupts having architecturally fixed interrupt priorities;
   a status register, coupled to said core, said status register comprising a vector table, and an interrupt register, said interrupt register having a plurality of configurable priority registers for storing said programmable priorities; and
   a priority encoder, coupled to both said first interrupts and to said second interrupts, and to said status register, said priority encoder prioritizing said first and second pluralities of interrupts utilizing said programmable priorities for said first interrupts and said architecturally fixed interrupt priorities for said second interrupts.

2. The processing system as recited in claim 1 wherein said plurality of first interrupts comprise:
   hardware interrupts; and
   software interrupts.

3. The processing system as recited in claim 2 wherein said hardware interrupts comprise:
   a performance counter interrupt; and
   a timer interrupt.

4. The processing system as recited in claim 1 wherein said core executes instructions.

5. The processing system as recited in claim 1 further comprising:
   an interrupt controller, coupled to said plurality of second interrupts, for providing said plurality of second interrupts to said priority encoder with predefined interrupt priorities.

6. The processing system as recited in claim 1 wherein said priority encoder produces an indication of which of said first and second pluralities of interrupts has the highest priority.

7. The processing system as recited in claim 6 further comprising:
   a vector generator, coupled to said priority encoder, for receiving said indication, and for producing an interrupt vector corresponding to said interrupt having the highest priority.

8. The processing system as recited in claim 1 wherein said plurality of configurable priority registers are writable by the processing system.

9. The processing system as recited in claim 1, wherein the priority encoder is configured to merge said first interrupts and said second interrupts for purposes of determining priority.

10. The processing system as recited in claim 9, wherein the first interrupts have values which are intermediate to the fixed interrupt priorities.

11. A microprocessor for handling interrupts, the microprocessor receiving first interrupts from an interrupt controller, the first interrupts having architecturally fixed interrupt priorities, the microprocessor comprising:
    a core, for executing instructions, said core generating second interrupts;
    priority storage logic, coupled to said core, for storing programmable priorities for said second interrupts; and
    a priority encoder, coupled to said core and to said priority storage logic, for receiving the first and said second interrupts, and for prioritizing the first and said second interrupts utilizing the architecturally fixed interrupt priorities for the first interrupts, and said programmable priorities stored in said priority storage logic for said second interrupts.

12. The microprocessor as recited in claim 11 wherein said interrupt controller receives a plurality of third interrupts from sources thereof, prioritizes said third interrupts, and provides the prioritized third interrupts to the microprocessor as the first interrupts.

13. The microprocessor as recited in claim 12 wherein the first interrupts are presented to the microprocessor on first interrupt signal lines attached to the microprocessor.

14. The microprocessor as recited in claim 11 wherein said instructions executed by said core comprise:
    first instructions for handling the first interrupts;
    second instructions for handling said second interrupts; and
    third instructions for storing said programmable priorities into said priority storage logic.

15. The microprocessor as recited in claim 11 wherein said second interrupts generated by said core comprise:
    hardware interrupts; and
    software interrupts.

16. The microprocessor as recited in claim 15 wherein said hardware interrupts comprise:
    a performance counter interrupt; and
    a timer interrupt.

17. The microprocessor as recited in claim 11 wherein said priority storage logic comprises:
    a plurality of interrupt priority fields, each of said fields corresponding to one of said second interrupts.

18. The microprocessor as recited in claim 17 wherein each of said plurality of interrupt priority fields comprises:
    a 4-bit field for storing one of sixteen distinct interrupt priorities.

19. The microprocessor as recited in claim 11 wherein said priority storage logic is located within a privileged resource within the microprocessor.

20. The microprocessor as recited in claim 19 wherein said privileged resource is programmable only when the microprocessor is executing privilege level, kernel mode, instructions.

21. The microprocessor as recited in claim 11 wherein the first interrupts have eight distinct priority levels.

22. The microprocessor as recited in claim 21 wherein said second interrupts have at least nine distinct priority levels that overlap the priority levels for the first interrupts.

23. The microprocessor as recited in claim 11 wherein said priority encoder, when prioritizing the first and said second interrupts, also uses priorities for the first interrupts established by the interrupt controller.

24. The microprocessor as recited in claim 11 wherein said priority encoder produces an indication of which of the first and said second interrupts has the highest priority.

25. The microprocessor as recited in claim 24 further comprising:

a vector generator, coupled to said priority encoder, for receiving said indication, and for producing an interrupt vector corresponding to a highest priority interrupt.

26. The microprocessor as recited in claim 25 further comprising:

programmable offset storage logic, coupled to said vector generator, for providing a programmed offset to said vector generator to allow said vector generator to produce said interrupt vector.

27. The microprocessor as recited in claim 26 wherein said programmable offset storage logic is programmed with said programmed offset by kernel mode instructions executing on the microprocessor.

28. The microprocessor as recited in claim 11, wherein the priority encoder is configured to merge said first interrupts and said second interrupts for purposes of determining priority.

29. The microprocessor as recited in claim 28, wherein the second interrupts have values which are intermediate to the fixed interrupt priorities.

30. A method for prioritizing core generated interrupts and off-core interrupts within a processing system, comprising:

receiving the off-core interrupts, the off-core interrupts having architecturally fixed interrupt priorities;

receiving the core generated interrupts, the core generated interrupts having programmable priority levels which are intermediate to the architecturally fixed interrupt priorities for the off-core interrupts;

sorting the received off-core and core generated interrupts according to their priority levels; and producing an indication of which of the received off-core and on-core interrupts has the highest priority.

31. The method as recited in claim 30 wherein the off-core interrupts are initially prioritized by an interrupt controller.

32. The method as recited in claim 30 wherein said sorting comprises:

examining the priority levels of each of the received off-core interrupts;

examining the programmable priority levels of each of the received core generated interrupts; and selecting one of the received core generated or off-core interrupts with the highest priority level.

33. The method as recited in claim 32 wherein said producing comprises:

receiving the one of the interrupts with the highest priority level;

examining a programmable offset; and calculating an interrupt vector for the one of the interrupts with the highest priority level utilizing said programmable offset.

34. The method as recited in claim 33 further comprising:

causing the processing system to jump to the interrupt vector.

* * * * *